(12) United States Patent
Lassota

(10) Patent No.: US 10,357,127 B2
(45) Date of Patent: Jul. 23, 2019

(54) SHEET METAL BEVERAGE BREWER HOUSING AND METHOD OF MAKING SAME

(75) Inventor: Zbigniew G. Lassota, Long Grove, IL (US)

(73) Assignee: FOOD EQUIPMENT TECHNOLOGIES COMPANY, INC., Lake Zurich, IL (US)

( * ) Notice: Subject to any disclaimer, the term of this patent is extended or adjusted under 35 U.S.C. 154(b) by 1086 days.

(21) Appl. No.: 12/248,130

(22) Filed: Oct. 9, 2008

(65) Prior Publication Data

US 2009/0255407 A1 Oct. 15, 2009

Related U.S. Application Data

(63) Continuation-in-part of application No. 10/884,149, filed on Jul. 2, 2004.

(60) Provisional application No. 60/998,574, filed on Oct. 11, 2007.

(51) Int. Cl.
*A47J 31/00* (2006.01)
*A47J 31/44* (2006.01)

(52) U.S. Cl.
CPC ........... *A47J 31/4403* (2013.01); *A47J 31/44* (2013.01); *A47J 31/00* (2013.01)

(58) Field of Classification Search
CPC ......... A47J 31/4403; A47J 31/44; A47J 31/00
USPC .............. 99/284, 279, 290, 307, 306, 302 R;
29/897.2, 421.1, 557, 525.14, 890.051,
29/890.039, 897.3, 422, 438, 514; 413/2,
413/1
See application file for complete search history.

(56) References Cited

U.S. PATENT DOCUMENTS

| | | | | |
|---|---|---|---|---|
| 4,157,609 A * | 6/1979 | Schutz | ............................ | 29/428 |
| 4,917,005 A * | 4/1990 | Knepler | .......................... | 99/280 |
| 5,000,082 A * | 3/1991 | Lassota | ........................... | 99/304 |
| 5,211,103 A * | 5/1993 | Anson | ............................. | 99/284 |
| 5,277,357 A * | 1/1994 | Miyamoto et al. | ........... | 228/142 |
| 5,875,703 A * | 3/1999 | Rolfes | ............................. | 99/283 |
| 6,082,246 A * | 7/2000 | Thorn et al. | .................... | 99/284 |
| 6,263,780 B1 * | 7/2001 | Rolfes | ............................. | 99/307 |
| 6,557,233 B1 * | 5/2003 | Rosch | .......................... | 29/421.1 |
| 6,712,575 B1 * | 3/2004 | Tuma et al. | ..................... | 413/2 |

(Continued)

*Primary Examiner* — Reginald Alexander
(74) *Attorney, Agent, or Firm* — James W. Potthast; Potthast & Associates

(57) ABSTRACT

A beverage brewer housing (10) for passing hot water though a dry ingredient to create a freshly brewed beverage with a lower housing section (14) for protectively containing a hot water tank and an upper housing section (12) attached to and cantilever supported upon the lower housing section (14) having a rearward upper section open to the lower housing section (14) for protectively containing an upper part of the hot water tank and a forward upper section for containing temperature sensitive electronics. A closure plate (26) defines a floor for the forward upper section to support the electronics and an upwardly extending interior wall (27) thermally, protectively, separating the forward upper section from heat within the rearward upper section generated by the hot water tank. Both Each of the housing sections (12, 14) are made from a single work piece of thin-walled stainless steel having a pair of planer side walls, a planer back wall and a curved front wall and an inwardly extending collar to enhance the lateral rigidity of the lower housing.

15 Claims, 3 Drawing Sheets

(56) References Cited

U.S. PATENT DOCUMENTS 6,739,241 B2 * 5/2004 Long et al. ................ 99/288
2005/0076784 A1 * 4/2005 Tebo et al. ................ 99/279

* cited by examiner

SHEET METAL BEVERAGE BREWER HOUSING AND METHOD OF MAKING SAME

CROSS-REFERENCE TO RELATED APPLICATION

This application claims the benefit under 35 U.S.C 119(e) of provisional patent application No. 60/998,574 of the present inventor filed Oct. 11, 2008 and entitled "Sheet Metal Beverage Brewer Housing and Method of Making Same", and is a continuation in part of and claims the benefit under 35 U.S.C 120 of U.S. application Ser. No. 10/884,149 filed Jul. 2, 2004 of Zbigniew G. Lassota and entitled "Beverage Apparatus with Non-rectilinear, Cornered Housing and Method of Making Same", both of which applications are hereby incorporated by reference.

BACKGROUND OF THE INVENTION

Field of the Invention

This invention generally relates to commercial beverage brewers and methods of making commercial beverage brewers, and more particularly, to beverage brewer housings made of sheet metal and methods of making same.

Discussion of the Prior Art

The drawings of this application relate solely to the construction of the brewer housing and do not shown the inner workings of the beverage brewers disclosed here. The invention does not involve any changes to the basic components that are generally present in any commercial coffee brewer or the like. If information concerning such incidental details is desired, then referenced should be made to one or more of U.S. patents of the present inventor including U.S. Pat. No. 5,000,082, entitled "Beverage Maker And Method Of Making Beverage", issued Mar. 19, 1991; U.S. Pat. No. 5,331,885, entitled, "Semiautomatic Beverage Maker And Method", issued Jul. 26, 1994; U.S. Pat. No. 5,943,944, issued Aug. 31, 1999 entitled, "Semiautomatic Beverage Maker and Method"; and U.S. Pat. No. 6,148,717, issued Nov. 21, 2000, entitled, "Beverage Maker with Intermittent Beverage Liquid Dispenser and apparatus and Method for Uniform Contact of Brew Ingredient with Brew Water" of the present inventor and the patents cited therein, all of which are incorporated herein by reference, for structural, mechanical and other details of the conventional components of coffee brewers and the like.

It is well known to make the housing of beverage makers such as commercial coffee brewers and tea brewers using stainless steel sheet metal. Subassemblies for the housing are often made with planer rectangular panels that are attached to each other at opposite sides to form four sided tubular side-wall subassemblies. The sidewall subassembly has four flat panels extending between four right angled corners with an open top and an open bottom. The four panels comprise a front side, a back side and a pair of parallel sides extending between the front and the back in spaced relationship.

It is also known to form the sidewall subassembly by bending three corners of a single work piece and then forming the fourth corner by welding together opposite ends of single sheet of metal. While these subassembly structures may be structurally adequate once fully assembled with a top closure and a bottom closure, because the thin walled sheet metal is flexible, there is often insufficient structural integrity to maintain the final shape of the open top and the bottom in a perfectly rectangular shape before attachment with the top closure and the bottom closure. Because of such distortion, the shape of the open top and the open bottom often do not perfectly match the shapes of precut sheet metal pieces that form closures for the open top and open bottom, in such case, smooth easy assembly of the rectangular shapes of the top and bottom closures with the mismatched open top and open bottom.

Generally, the rigidity may be improved by increasing the thickness of the work piece of the sidewall subassembly but this adds to the cost of materials and also to the weight of the finished housing assembly and the food equipment employing the heavier housing. It is known to mold the housing of a beverage brewer from plastic or the like but such non-metallic, plastic materials are not generally suitable for commercial application in which the housing must be generally impervious to commercial cleaning solvents, beverage stains, hot water, etc. and must be easily cleaned.

SUMMARY OF THE INVENTION

It is therefore an object of the present invention to provide a beverage brewer and method of making same with a sidewall subassembly comprised of a single work piece of stainless steel sheet material that has been bent into desired configuration that will hold its shape to facilitate assembly with a bottom closure and a top closure and thereby overcomes the problems of known brewer housings noted above.

This is achieved in part by providing the sidewall work piece with four bent, or folded comers intermediate the opposite ends and fastening the opposite ends together at a location spaced from the corners, instead of forming the fourth corner by attaching the opposite ends together at the corner. This technique is also shown in co-pending U.S. application Ser. No. 10/884,149, filed Jul. 2, 2004, and entitled "Beverage Apparatus with Non-rectilinear, Cornered Housing and Method of Making Same", which is hereby incorporated by reference.

The object of the invention is also achieved in part by providing at least one of the panels with a top and bottom bearing a series of kerfs along the top and bottom of the panel to facilitate bending of the panel into an arcuate shape to provide improved rigidity to the sidewall subassembly.

The object is also achieved in part by providing an inwardly extending reinforcing collar at the top and bottom of the panels with opposite V-shaped notches at locations of where the bends are to be made to form the corners to both enhance structural rigidity of the side wall subassembly and to provide a horizontal surface to support and facilitate attachment to top and bottom closures.

The objective is obtained, partly, by providing a beverage brewer for passing hot water though a dry ingredient to create a freshly brewed beverage, with a brewer housing, having a lower housing section for protectively containing a lower part of a hot water tank, an upper housing section attached to and cantilever supported upon the lower housing section, said upper housing section having a rearward upper section open to tire lower housing section for protectively containing an upper part of the hot water tank and a forward upper section for containing temperature sensitive electronics, said rearward upper section being vertically aligned with the lower housing section and said forward upper section extending forwardly of the lower housing section and the rearward upper section, and a closure plate defining a floor for the forward upper section to support the electronics and an upwardly extending interior wall thermally, protectively, separating the forward upper section from heat within the rearward upper section, generated by the hot water tank The objective is also partly acquired by provision of a beverage brewer for passing hot water though a beverage ingredient to make a freshly brewed beverage with a brewer housing, having a lower housing section made from a single work piece of thin-walled stainless steel having a pair of planer side walls, a planer back wall and a curved front wall, an upper housing section made from a single work piece of thin-walled stainless steel having a pair of planer side walls, a planer back wall and a curved front wall, an inwardly extending collar at the top of the lower housing to enhance the lateral rigidity of the lower housing, said upper housing section having an upper forward section, and an upper rearward section attached to the collar of the lower housing section to cantilever mount the upper forward section at a location extending forwardly of the tower housing section.

The objective is also obtained by providing a beverage brewer for passing hot water though a beverage ingredient to make a freshly brewed beverage, with a brewer housing, a lower housing section with an inwardly extending collar, an upper housing section integrally made from a single thin-walled stainless steel work piece with a top, a bottom, and a pair of planer side walls, a curved front wall, a pair of back end walls joined together by a weld joint to define a back wall, all extending between the top and the bottom.

Moreover, the object is acquired, in part, by providing a beverage brewer for passing hot water though a beverage ingredient to make a freshly brewed beverage, with a brewer housing, including a lower housing section made from a single thin-wailed, stainless steel, work piece having a front wall, a pair of side walls and a pair of inwardly extending, back, end walls separated by a space defining an access panel, and an upper housing section made from another single, thin-walled, stainless steel, work piece having a front wall, a pair of side walls and a pair of inwardly extending, back, end walls joined together by a weld joint.

BRIEF DESCRIPTION OF THE DRAWINGS

The foregoing objects, features and advantages will be described in greater detail and further features and advantages will be made apparent from the detailed description of an embodiment given with reference to the several figures of the drawing, in which.

DETAILED DESCRIPTION

Figure 1:
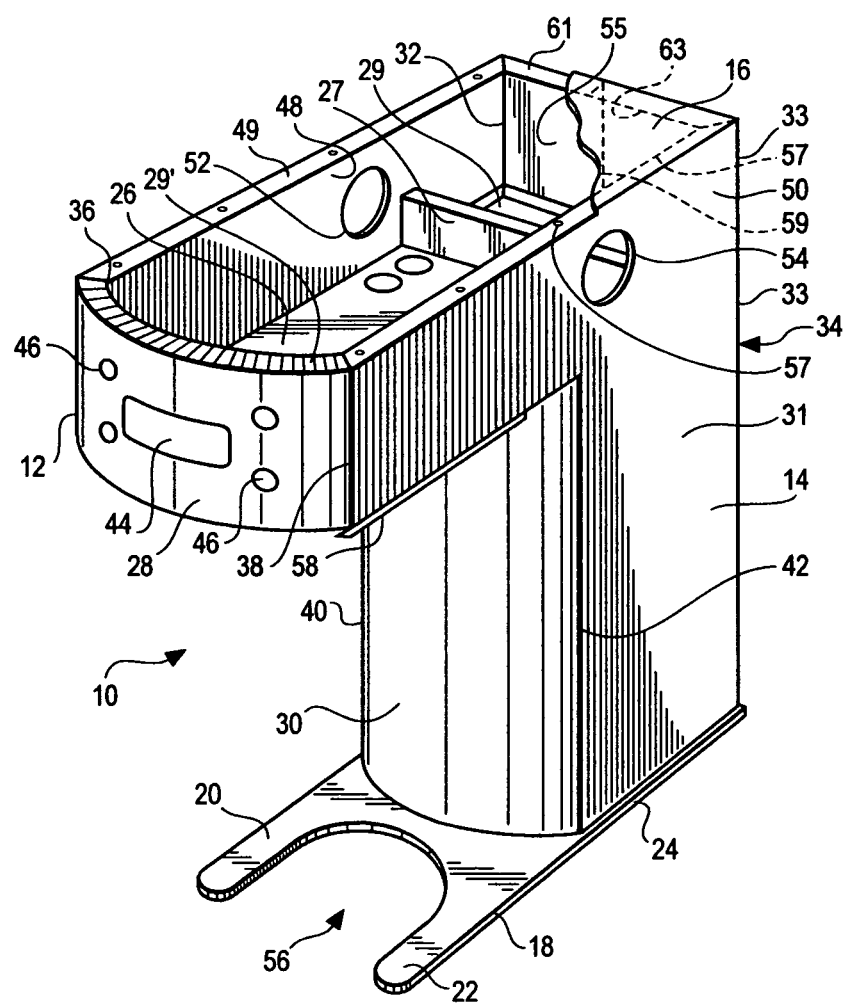
FIG. 1 is a perspective view of a beverage brewer housing constructed in accordance with the present invention.

Referring to FIG. 1, the beverage brewer housing 10 is seen to include an upper housing section 12 and an underlying lower housing section 14 that is attached to and supports the upper housing section 12. The upper section 12 has a top closure, or brewer top 16. The lower housing section is supported by a base 18 with a pair of laterally spaced, forwardly extending feet 20 and 22. The feet 20 and 22 extend forwardly from an aft, bottom closure plate 24.

Another closure plate 26 provides a floor for the toward part of upper housing 12 and maintains assists in maintaining the shape of the upper housing section by blocking inward flexing of the planer side wall. It extends backwards from an arcuate front that conforms to upper arcuate wail 28 to an upstanding, reinforcing, knee wall 27. The knee wait 27 is integrally formed with the closure plate by upwardly bending a back edge. The back portion 29 of the upper housing section 12 has no closure and freely communicates with the lower housing section 14. A hot water tank (not shown) is substantially housed within the lower housing section 14 along with heating elements and temperature sensors, but a top portion of the hot water tank extends upwardly past the top of the lower housing section 14 and into the back portion 29 of the upper housing section located behind the knee wall 27.

Because of the presence of the hot water tank, the back portion 29 is the hottest part of the upper housing section 12. The knee wall 27, in addition to providing stiffening of the back edge of the closure plate 26 and general lateral reinforcement, functions to block or deflect hot air away from the portion of the upper housing located in front of the knee wall 27. The forward portion of housing section 12 houses most of the control and display electronics (not shown) and needs to be protected from excessive heat. Conduit for passing hot water to the brew basket contained within the forward portion is insulated.

Both the upper housing section 12 and the lower housing section 14 have a generally rectangular cross section except for an upper, arcuate, forwardly extending front wall 28 of the upper housing section 12 and a lower, arcuate, forwardly extending front wall 30 of the lower housing section. All the other walls of both the upper housing section 12 and the lower housing section 14 are substantially planer and the rear corners 32 and 33 of the upper housing section 12 and rear corner 34 of the lower housing section 14 are substantially square, or form ninety degree, right angles. On the other hand, because of the arcuate shape of the upper arcuate wall 28, the front corners 36 and 38 of the upper housing section 12 form obtuse angles greater than ninety degrees. Likewise, the front corners 40 and 42 of the lower housing section form obtuse angles greater than ninety degrees. A rectangular planer side wall 31 extends between the front corner 42 and the rear corner 34 of the lower housing section 14.

The upper, arcuate wall 28 has a rectangular opening 44 for mounting of an electronic alphanumeric display (not shown) and four, substantially identical, circular holes 46 for the mounting of push-button switches (not shown) used to control the beverage brewer when fully assembled. The parallel, planer, sidewall s 48 and 50 of the upper housing section 12 have ventilation holes 52 and 54, respectively, within which are mounted louvered ventilation covers (not shown). The upper housing section 12 generally houses a hot water delivery system including a dispense valve (not shown) for dispensing hot water into a brew basket that is slideably, removably mounted beneath the forward portion of the closure plate 26 that is cantilever mounted above the space 56 between the feet 20 and 22. The brew basket is mounted by means of a pair of parallel rails 58 (only one shown) fastened to the underside of the plate 26. During operation and performance of a brew cycle, a beverage dispenser (not shown) is located in the space 56 to receive the freshly brewed beverage that passes out of a drain hole in the bottom of the brew basket.

Figure 3:
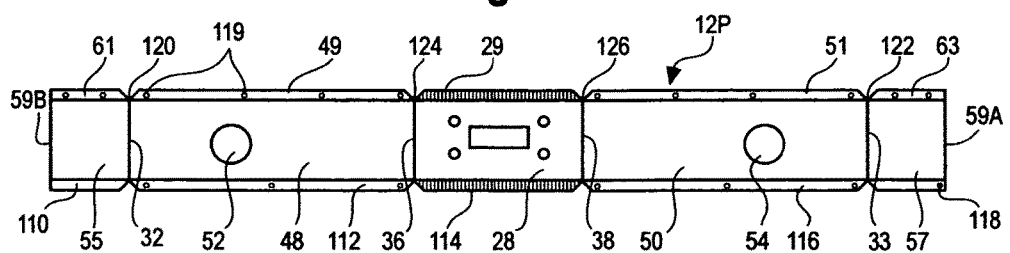
FIG. 3 is a plan view of a single piece of metallic sheet material that has been cut in accordance with the invention to form the upper section of the housing of FIG. 1.

A planer, rectangular rear wall has two sections 55 and 57 that are joined in abutting relationship and welded to each other along a juncture 59. Attached to the tops of the of the front wail 28, the side wall 48, the side wall 50 and the rear wall formed by section 55 and 57 are inwardly extending, horizontal, top collars 29, 49, 51, 61 and 63, respectively. The top collar 29 has a series of kerfs extending along its length. Also attached to the bottoms of these walls, but not seen in FIG. 1, are inwardly extending, horizontal, bottom collars that are substantially identical to and located directly opposite the top collars 29, 49, 51, 61 and 63. The bottom collar opposite the top collar 29 has a series of kerfs running extending along its length. The portion of the work piece from which the bottom collars are formed is described below with respect to FIG. 3.

Figure 2:
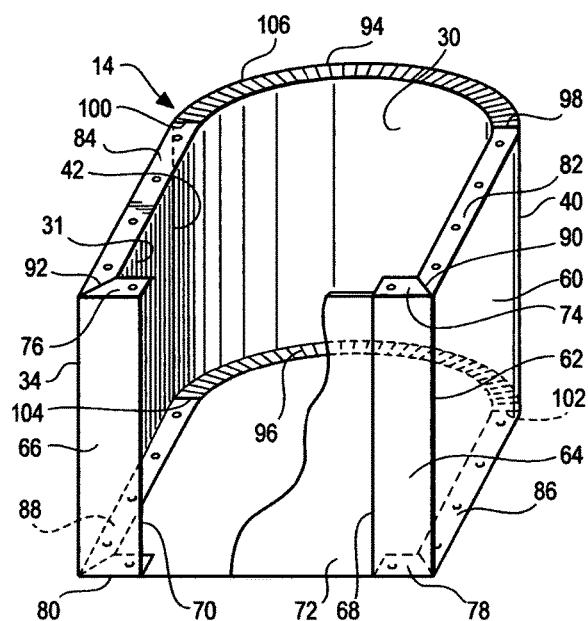
FIG. 2 is a perspective illustration of the lower housing section after it has been bent into its assembled state.

Referring to FIG. 2, the lower housing section 14 is seen to include another planer sidewall 60 that is parallel to the opposite side wall 31 and extends between the forward corner 40 and a rearward, right angle bent corner 62. A pair of relatively narrow, planer back walls 64 and 66 extend inwardly toward each other from the right angle corners 62 and 34, respectively. Back wall 64 terminates at a straight edge 68, and back wall 66 terminates at a straight edge 70. The space between the edges 68 and 70 is filled by a removable access panel closure 72 made of a rectangular piece of sheet metal. The access panel closure 72 is held in position by suitable releasable fasteners such as resilient snap fasteners (not shown). Except for the closure 72 the lower housing section is farmed from a single work piece.

A pair of horizontal top back collars 74 and 76 is integrally formed with the tops of back walls 64 and 66, respectively, and a pair of corresponding horizontal bottom back collars 78 and 80 is integrally formed with the bottom of the back walls 64 and 66, respectively. The back collars 74, 76, 78 and 80 form right angles relative to the plane of the back walls 64 and 66 and are parallel to each other.

Similarly, a pair of horizontal top side collars 82 and 84 is integrally formed with the tops of the side walls 60 and 32, respectively, and a pair of corresponding horizontal bottom side collars 86 and 88 is integrally formed with the bottoms of side walls 60 and 32, respectively. The side collars 82, 84, 86 and 88 form right angles relative to the parallel planes of the side walls 60 and 62.

The top side collars 82 and 84 abut the back collars 74 and 76 along 45-degree miter lines 90 and 92, respectively, and welded together to hold their associated side walls and back walls in a right angled relationship.

The arcuate front wall 30 also has a horizontal, top front collar 94 and a horizontal bottom front collar 96 integrally formed with the top and bottom of the arcuate front wall 30, respectively. The collars 94 and 96 have a slightly less width dimension than the other collars. The top front collar 96 forms a right angle relative to the vertical surface of the arcuate front wall 30. The top front collar 94 has a pair of opposite ends that abut with the top side collars 82 and 84, respectively, along abutment junction lines 98 and 100, and are welded together along the abutment junction lines 98 and 100.

Similarly, the bottom front collar 96 forms aright angle relative to the vertical surface of the arcuate front wall 30, and has a pair of opposite ends that abuts with tire bottom side collars 86 and 88, respectively, along abutment junction lines 102 and 104. The opposite ends of the bottom front collar 96 are welded to the bottom side collars 86 and 88 along the abutment junction lines 102 and 104.

Unlike the other collars, the front collars 94 and 96 have a series of kerfs 106 and 108, respectively, cut inwardly from the distal edges to the juncture of the collars with the arcuate front wall 30. The series of kerfs 106 and 108 extend for the entire length of the collars and end at the abutment junction lines 98 and 100. The kerfs, cuts, or slots are approximately 1/16-inch to 1/3-inch wide and the distance between the cuts, or the width of the kerf fingers, is approximately 1/4-inch. There are approximately thirty-two kerfs in the series.

Referring now to FIG. 2, the upper housing is made from a single work piece 12P that has been cut with an Industrial laser cutter from a 12-14 gage, rectangular planer sheet of series 300-400 stainless steel. The bottom collars located opposite the upper collars 61, 49, 29, 51 and 63 are 110, 112, 114, 116 and 118, respectively. The work piece 12P has a width of approximately 4-inches and a length of approximately 45-inches. In addition to cutting out the perimeter shape, the kerfs are formed as well as the openings for ventilation, electronic display and push button control switches. Also, all the collars, except the arcuate collars 29 and 114, have a plurality of small, round rivet holes 119 cut for receipt of rivets for fastening the upper housing section 12 to the lower housing section 14, as shown in FIG. 1.

The collars are provided with a pairs of V-shaped cuts at each of the corners. The pairs of V-shaped slots 120 and 122 of corners 32 and 33 are 45-degrees such that when the walls on opposite sides of the slots form a right angle the edges of the slots come into abutment with each other which prevents further bending beyond 90-degrees. On the other hand, the pair of opposed V-shaped slots 124 and 126 on opposite sides of the corners 36 and 38 are less than 45-degrees, and accordingly, further bending of the front wall relative to the side walls 48 and 50 is prevented by the abutment of opposite edges of the V-shaped slots prior to 90-degrees being reached. In the case of the V-shaped cuts having an angle of only 30-degrees, abutment occurs when the angle between the front wall and the side walls 48 and 50 reach only 120-degrees. This may be used to limit further bending of the front wall but preferably both the abutment of the ends of the kerf fingers, or tabs, and the abutment of the V-shaped slots 124 and 126.

In accordance with the method of making the brewer housing of the present invention, the following steps are performed in order to shape the work piece 12P into the upper housing section 12 shown in FIG. 1. First, a brake machine is used to bend all the collars until they form a right angle with the body of their associated housing walls. Second, the break machine is used to bend the body at the corners 36 and 38 and then the corners 32 and 33, The corners 36 and 38 are bent to an angle greater than 90-degrees and the corners 32 and 33 are bent to an angle of approximately 90-degrees. Third, the opposite ends 59A and 59B are brought together into abutting relationship and welded together to form juncture 59 of FIG. 1. As the ends 59A and 59B are brought together, the front wall 28 bends into an arcuate shape as shown in FIG. 1, and the distal ends of adjacent kerf fingers of the collars 29 and 114 abut one another when the final arcuate shape is reached and thereby block further bending.

It is the pre-weakening of the collars 29 and 114 by the series of kerfs, and specifically the gaps formed by the kerfs, that enable the bending of the front wall into an arcuate shape. The collars of the planer sidewalk, on the other hand, have no kerfs and therefore are maintained in a planer configuration during bending. Widening the width of the kerfs increases the degree to which the front wall 28 will be bent away from a planer shape. Once the ends of the adjacent kerf fingers abut each other, no further bending of the front wall 28 takes place. This preferably occurs before or concurrently with the abutment of the opposite sides of the V-shaped slots as previously noted. Preferably, this degree of bending occurs only when the opposite ends 59A and 59B are brought together, and not before, to enhance the rigidity of the collars 29 and 114. The alignment of the kerf and tabs on the upper and lower collars affect a uniform and straight curve.

After, the junction 59 has been formed and welded, the bottom closure 26 is inserted through the top and positioned for underlying support by die bottom collars 112, 114 and 116 with the arcuate shaped portion of the closure abutting the interior surface of the front wall 28 and the sides of the wall abutting against the interior sides of the walls 48 and 50, as shown in FIG. 1. The closure, or floor, 26 is fastened to the bottom collars 112 and 116 by means of rivets that pass through the rivet holes 119 and mating rivet holes in the top collars of the lower housing section 14. There are no rivets attaching the floor 26 to the arcuate bottom collar 114 of the front wall Advantageously, the bending of the stainless steel front wall 28 into an arcuate shape places it into a stressed state. Because of the resilient memory of the high grade stainless steel, release of the opposite ends of the arcuate wall 28 after being bent would result in the arcuate front wall returning to a planer configuration. This stressed state, as well as the arcuate shape, enhances the rigidity and structural integrity of the upper housing section 14, particularly the front arcuate wall 28. Structural integrity and rigidity of the portion of the closure 26 suspended between the opposed bottom collars 112 and 116 also enhanced by provision of the upstanding knee wall 27, discussed above with respect to FIG. 1, and the rivet attachment of the floor 26 to bottom collars 112 and 116 prevents the side walls 48 and 50 from being distorted into a non-planer shape.

Figure 4:
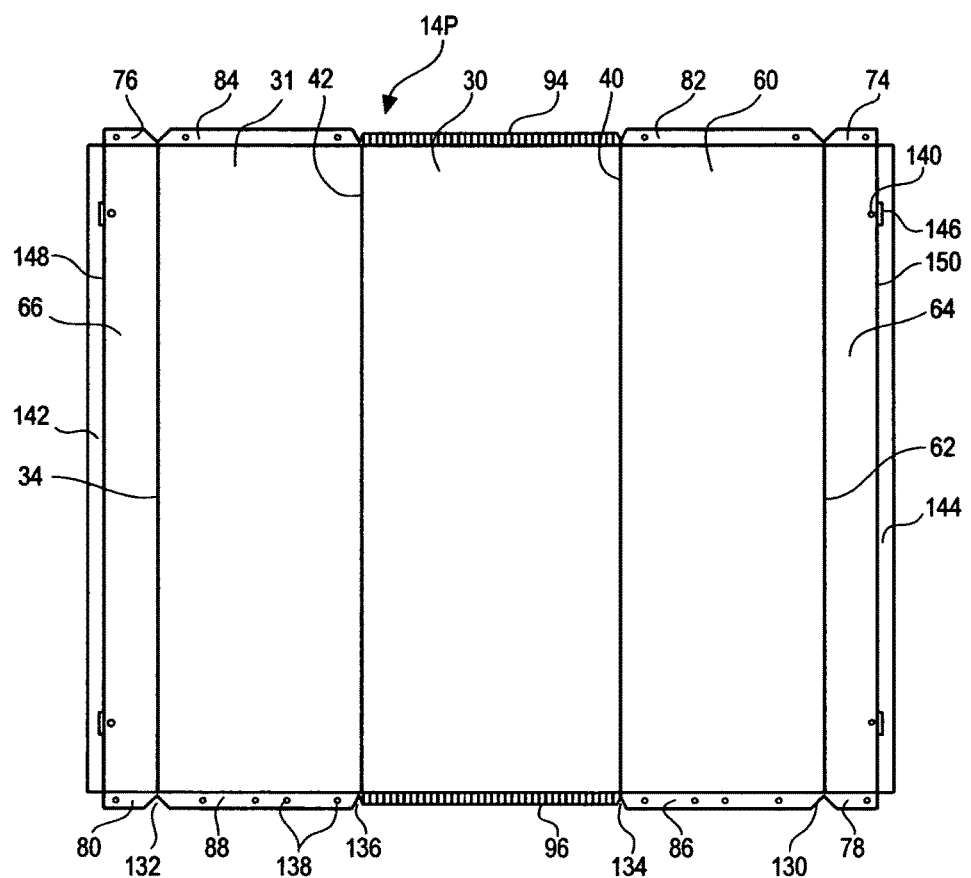
FIG. 4 is a plan view of a single piece of metallic sheet material that has been cut in accordance with the invention to form the lower section of the housing of FIG. 1.

Referring to FIG. 4, the lower housing 14 is made from a single work piece 14P that is cut from 300-400 series stainless steel 12-14 gage sheet. It is generally like the work piece 12P. It has 45-degree V-shaped slots 130 and 132 at opposite sides of the corners 34 and 62, respectively, and smaller degree V-shaped slots, such as 60-degree slots, 134 and 136 at opposite ends of the corners 40 and 43, respectively. A plurality of round rivet holes 138 are provided in the top collars 76, 84, 82, and 74, and a different plural number of rivet holes 140 are provided in the bottom collars 80, 88, 86 and 78. No rivet holes are provided in the arcuate collars 94 and 96. Rivet holes 140 are also provided in the narrow back walls 64 and 66 for attachment to an upstanding frame member (not shown) contained within the lower housing section 14.

Relatively long narrow reinforcing strips 142 and 144 are attached along the sides of edges 70 and 72, FIG. 1. The reinforcing strips 142 and 144 have no collars and their top ends are beneath the adjacent collars when the collars are bent 90-degrees relative to the narrow back walls 66 and 68, respectively. Stress release slots 146 in the reinforcing strips 142 are located adjacent the rivet holes to reduce dimpling when the rivets are fastened to the support member (not shown). The arcuate collars 96 and 94 and the kerfs formed therein are generally the same as described above with respect to the collars 29 and 114 of the work piece 12P.

The lower housing section 14 is formed from the work piece 14P in the same general way as described above with respect to the formation of the upper housing section 12 from the work piece 12P. First, the collars are bent 90-degrees relative to the bodies of their associated walls. Next, the corners are formed by folding the work piece along a lines extending between the V-shaped notches with right angles being formed at the corners 34 and 62 and less than right angles being formed at the corners 42 and 40, the reinforcing strips 142 and 144 are bent to form 90-degree corners relative to the narrow back walls 66 and 64 along lines 148 and 150. The work piece is then otherwise bent to the position shown in FIGS. 1 and 2 and the bottom collars are attached to the base plate 24 and the narrow back walls riveted to the vertical support members.

Next, the upper housing section 12 is placed on top of the lower housing section and the bottom collars of the upper housing section 12 are riveted to the top collars of the lower housing section in the configuration shown in FIG. 1. In all cases where rivets are employed, spot welding may also be used to supplant or supplement these mechanical fasteners. The operating parts of the brewer are then installed into the upper housing section and the lower housing section. When all the parts have been installed, the access panel, door 72 is mounted the close the opening between the narrow back walls 66 and 64.

While a detailed description of a preferred embodiment of the invention has been, provided, it should be appreciated that many variations may be made without departing from the spirit of the invention. For instance, kerfs could be provided at different ones of the collars to enable them to also assume an arcuate shape. The bending could be inward instead of outward and the degree of bending can be altered by changing the size, number and spacing of the kerfs. Other variations will occur to persons of ordinary skill in the art.

The invention claimed is:

1. In a beverage brewer for passing hot water from a hot water tank though a dry ingredient to create a freshly brewed beverage and having temperature sensitive electronics, a brewer housing, comprising:
   a lower housing section for protectively containing a lower part of the hot water tank;
   an upper housing section attached to and cantilever supported upon the lower housing section, said upper housing section having
      a rearward upper section open to the lower housing section, said rearward upper section protectively containing an upper part of the hot water tank, and
      a forward upper section for protectively containing the temperature sensitive electronics, said rearward upper section being vertically aligned with the lower housing section and said forward upper section extending forwardly of the lower housing section and the rearward upper section;
   a closure plate defining a floor for the entire forward upper section to support the electronics, said floor having a front, a back and a pair of sides that extend between the front and the back; and
   an interior wall thermally, protectively, separating the temperature sensitive electronics contained within the forward upper section from heat within the rearward upper section generated by the upper part of the hot water tank protectively contained and surrounded by the rearward upper section of the upper housing, said interior wall joined to the back of the floor and extending upwardly therefrom and said floor covering the entire space between the front, back and sides of the forward upper section.

2. The beverage brewer of claim 1 in which the closure plate and the protective wall extend between and engage opposed side walls of the upper section to block inward flexing of the opposed side walls of the upper section.

3. The beverage brewer of claim 1 in which
   the upper housing section has a front wall that is entirely arcuate, and
   the closure plate extends backwardly from the arcuate front wall to the upwardly extending interior wall.

4. In a beverage brewer for passing hot water though a beverage ingredient to make a freshly brewed beverage, a brewer housing, comprising:
- a lower housing section made from a single work piece of resilient, thin-walled stainless steel having a pair of planer side walls spaced apart by a preselected distance, a and an arcuate curved front wall bent into a stressed curved state in which the curved front wall is arcuately curved for the entire preselected distance between the pair of planer sidewalls, said lower housing section secured to a base plate to hold the curved wall in said stressed state, said stressed state of the curved front wall enhancing the lateral rigidity and structural integrity of the lower housing section;
- an upper housing section made from a single work piece of resilient thin-walled stainless steel having a pair of planer side walls spaced apart by the preselected distance, a planer back wall having a pair of wall sections held together in abutting relationship by a weld joint, and an curved front wall bent into a stressed curved state in which the curved front wall is arcuately curved for the entire preselected distance between the pair of parallel side walls of the upper housing section, said curved front wall of the upper housing section being held in a bent stressed state by the weld joint, said stressed state of the curved front wall of the upper housing section enhancing the lateral rigidity and structural integrity of the upper housing section;
- an inwardly extending collar at the top of the lower housing section including a top of the curved front wall of the lower housing section to further enhance the lateral rigidity of the lower housing; and
- said upper housing section having
  - an upper forward section, and
  - an upper rearward section attached to the collar of the lower housing section to cantilever mount the upper forward section at a location extending forwardly of the lower housing section.

5. In a beverage brewer for passing hot water though a beverage ingredient to make a freshly brewed beverage, a brewer housing, comprising:
- a base plate;
- a lower housing section made from a single work piece of resilient, flexible thin-walled stainless steel that has been bent to form
  - a pair of parallel, planer side walls spaced apart by a preselected distance, a pair of planer, aligned, back wall sections and
  - an arcuately curved front wall bent into a stressed curved state in which the curved front wall is arcuately curved for the entire preselected distance between the pair of planer sidewalls,
  - said lower housing section having a bottom secured to the base plate to assist in maintaining said front wall in a stressed state of curvature, said stressed state of the curved front wall enhancing the lateral rigidity and structural integrity of the lower housing section;
- an upper housing section integrally made from a single work piece of resilient, flexible, thin-walled stainless steel that is bent to form
  - a pair of planer side walls,
  - a planer back wall having a pair of wall sections held together in abutting relationship by a weld joint, and
  - a curved front wall held in a bent, stressed state by the weld joint, said stressed state of the curved front wall of the upper housing section enhancing the lateral rigidity and structural integrity of the upper housing section; and
- a fastening member formed from a part of the work piece at the top of the lower housing section for mounting the upper housing on top of the lower housing section.

6. The beverage brewer of claim 5 in which the upper housing section has a bottom an inwardly extending collar aligned with and supported by the inwardly extending collar of the lower housing section.

7. The beverage brew of claim 6 in which the collar of the upper housing and the collar of the lower housing are secured together by fasteners passing through the collars.

8. In a beverage brewer for passing hot water though a beverage ingredient to make a freshly brewed beverage, a brewer housing, comprising:
- a lower housing section made from a single work piece of resilient, flexible, thin-walled, stainless steel that has been bent to form
  - a pair of parallel, planer side walls spaced apart by a preselected distance,
  - a front wall bent into a stressed curved state in which the curved front wall is arcuately curved for the entire preselected distance between the pair of planer sidewalls, and
  - a pair of aligned inwardly extending, back, end wall sections extending towards each other by a substantial amount but separated by a space defining an access panel opening; and
- an upper housing section mounted to the top of the lower housing section made from another single, thin-walled, stainless steel, resilient work piece that is bent to form a pair of planer side walls spaced apart by the preselected distance, a front wall bent into a stressed curved state in which the curved front wall is arcuately curved for the entire preselected distance between the pair of parallel side walls , and a pair of inwardly extending, back, end walls joined together by a weld joint, said weld joint holding the curved wall in a stressed state, said stressed state of the curved front wall of the upper housing section enhancing the lateral rigidity and structural integrity of the upper housing section.

9. The beverage brewer of claim 8 in which the access opening is filled by a removable access panel closure formed from a single work piece and releasably held in position by releasable fasteners.

10. The beverage brewer of claim 8 in which
- the lower housing section has a top and an inwardly extending mounting collar formed into the top of the single work piece of the lower housing, and
- the upper housing section has a bottom and another inwardly extending mounting collar formed into the bottom of the single work piece of the upper housing for mating with the inwardly extending mounting collar of the lower housing section, and including
- means for fixedly attaching together the mating collars in abutting relationship to secure the upper housing section on top of the lower housing section.

11. In a beverage brewer for passing hot water though a beverage ingredient to make a freshly brewed beverage, a brewer housing, comprising:
- a lower housing section made from a single work piece of resilient, thin-walled stainless steel having a pair of planer side walls, a planer back wall and a curved front wall bent into a stressed state, said lower housing section secured to a base plate to hold the curved wall in said stressed state, said stressed state of the curved front wall enhancing the lateral rigidity and structural integrity of the lower housing section;

an upper housing section made from a single work piece of resilient thin-walled stainless steel having a pair of planer side walls, a planer back wall having a pair of wall sections held together in abutting relationship by a weld joint, and a curved front wall held in a bent stressed state by the weld joint, said stressed state of the curved front wall of the upper housing section enhancing the lateral rigidity and structural integrity of the upper housing section;

an inwardly extending collar at the top of the lower housing section including a top of the curved front wall of the lower housing section to further enhance the lateral rigidity of the lower housing, the inwardly extending collar at the curved front wall being curved to conform to the curved front wall, said inwardly extending collar where curved having a series of kerfs defining a corresponding series of abutting kerf fingers between the kerfs that enable the curved front wall and inwardly extending collar to be bent into a curved shape; and said upper housing section having
an upper forward section, and
an upper rearward section attached to the collar of the lower housing section to cantilever mount the upper forward section at a location extending forwardly of the lower housing section.

12. In a beverage brewer for passing hot water though a beverage ingredient to make a freshly brewed beverage, a brewer housing, comprising:

a lower housing section made from a single work piece of resilient, thin-walled stainless steel having a pair of planer side walls, a planer back wall and a curved front wall bent into a stress state, said lower housing section secured to a base plate to hold the curved wall in said stressed state, said stressed state of the curved front wall enhancing the lateral rigidity and structural integrity of the lower housing section;

an upper housing section made from a single work piece of resilient thin-walled stainless steel having a pair of planer side walls, a planer back wall having a pair of wall sections held together in abutting relationships by a weld joint, and a curved front wall held in a bent stressed state by the weld joint, said stressed state of the curved front wall of the upper housing section enhancing the lateral rigidity and structural integrity of the upper housing sections;

an inwardly extending collar at the top of the lower housing section including a top of the curved front wall of the lower housing section to further enhance the lateral rigidity of the lower housing; and said upper housing section having
an upper forward section, and
an upper rearward section attached to the collar of the lower housing section to cantilever mount the upper forward section at a location extending forwardly of the lower housing section, and
an inwardly extending collar having a curved part with kerfs and abutting kerf fingers that aligns with and is supported by the inwardly extending collar with kerfs and abutting kerf fingers at the top of the lower housing.

13. The beverage brewer of claim 12 in which the upper housing collar is riveted to the lower housing collar.

14. In a beverage brewer for passing hot water though a beverage ingredient to make a freshly brewed beverage, a brewer housing, comprising:

a base plate;

a lower housing section made from a single work piece of resilient, flexible thin-walled stainless steel that has been bent to form a pair of parallel, planer side walls, a pair of planer back wall sections and a front curved wall bent into a stressed state with an inwardly extending collar, said lower housing section having a bottom secured to the base plate to assist in maintaining said front wall in a stressed state of curvature, said stressed state of the curved front wall; and an upper housing section integrally made from a single work piece of resilient, flexible, thin-walled stainless steel that is bent to form a pair of planer side walls, a planer back wall having a pair of wall sections held together in abutting relationship by a weld joint, and a curved front wall held in a bent, stressed state by the weld joint, said stressed state of the curved front wall of the upper housing section enhancing the lateral rigidity and structural integrity of the upper housing section, the curved front wall of the upper housing section having an inwardly extending collar formed by a series of kerfs and abutting kerf fingers at a top of the single work piece of the upper housing section;

a fastening member formed from a part of the work piece at the top of the lower housing section for mounting the upper housing on top of the lower housing section.

15. In a beverage brewer for passing hot water though a beverage ingredient to make a freshly brewed beverage, a brewer housing, comprising:

a lower housing section made from a single work piece of resilient, flexible, thin-walled, stainless steel, work piece having a curved front wall bent into in a state of stress, a pair of side walls and a pair of aligned inwardly extending, back, end wall sections extending towards each other by a substantial amount but separated by a space defining an access panel opening; and an upper housing section mounted to the top of the lower housing section made from another single, thin-walled, stainless steel, resilient work piece that is bent to form a curved front wall front wall bent into a state of stress, a pair of parallel side walls and a pair of inwardly extending, back, end walls joined together by a weld joint, said weld joint holding the curved wall in a stressed state, said stressed state of the curved front wall of the upper housing section enhancing the lateral rigidity and structural integrity of the upper housing section, the curved front wall of the upper housing section having an inwardly extending collar with a series of kerfs and abutting kerf fingers.

\* \* \* \* \*